June 30, 1964 A. FRANCK ETAL 3,139,531

MAGNETIC SHIFT CIRCUITS

Filed Oct. 11, 1960 3 Sheets-Sheet 1

INVENTORS
ABRAHAM FRANCK
GEORGE F. MARETTE
BERC I. PARSEGYAN

BY Herbert F. Somermeyer

ATTORNEY

MAGNETIC SHIFT CIRCUITS

Filed Oct. 11, 1960 3 Sheets-Sheet 2

INVENTORS
ABRAHAM FRANCK
GEORGE F. MARETTE
BERC I. PARSEGYAN
BY
ATTORNEY

MAGNETIC SHIFT CIRCUITS

INVENTORS
ABRAHAM FRANCK
GEORGE F. MARETTE
BERC I. PARSEGYAN
BY Herbert F. Somermeyer
ATTORNEY United States Patent Office 3,139,531

Patented June 30, 1964

3,139,531

MAGNETIC SHIFT CIRCUITS

Abraham Franck and George F. Marette, Richfield, and Berc I. Parsegyan, St. Paul, Minn., assignors to Sperry Rand Corporation, New York, N.Y., a corporation of Delaware Filed Oct. 11, 1960, Ser. No. 61,888
15 Claims. (Cl. 307—88)

This invention relates to electrical signal shifters of the matrix type and more particularly to double-length digital signal word shifting devices using a single-length matrix of saturable transformers constructed with ultra-thin ferromagnetic cores having uniaxial anisotropy.

The term single-length digital word usually defines the number of individual binary signals grouped together for handling as a unit within electronic digital systems, such as automatic calculators. A common example of a single word length is 24 binary digits (bits). A double-length word is merely two single-length words combined to form a single number indicating unit of twice the number of bits in a single-length word. This invention saves components by splitting a word into two parts. The original word is the "double-length" word and the two halves thereof are the "single-length" word as the terms are used in the following description of the present invention.

A common time consuming machine operation on single and double-length digital signal words is that of shifting the signals within the register for giving the number represented therein a different significance. In prior art shifting registers, a unit interval of time is generally consumed for shifting the information signals one digit position.

Accordingly it is an object of our invention to provide a double-length word shifting device having a single-length word shifting matrix which accomplishes a complete shift of the contents of the register any desired number of digit positions in only two unit intervals of time.

It is another object to provide a double-length word shifting device having only a single-length shift matrix which interprets the shift count in two distinct steps.

It is a further object of the present invention to provide output shifting gating means for transposing in one of two sequences electrically shifted signals having an indeterminate numeric significance.

Still another object of our invention is to provide an improved digital information shifting device which utilizes thin ferromagnetic film type switching elements therein such that high operational rates may be achieved.

The present invention accomplishes these and other objects by sequentially parallel shifting single-length words through a single-length shifting means to a double-word length set of output lines without regard to the ultimate shifted numeric significance. When the shift count equals or exceeds the number of digit positions or signals in a single-length word the output line signals from the arbitrarily designated lower order portion of the double-length input are effectively shifted one word length (circularly) while the higher order shifted signal portion is transferred without this effective shift. When the shift count is less that the said number, the revrese is true. As will become apparent this procedure results in an effective double-length shift through a single-length digital signal shift matrix.

These and other more detailed and specific objects will be disclosed in the course of the following specification, reference being had to the accompanying drawings, in which—

Figure 1:
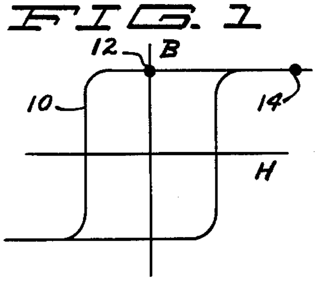
FIG. 1 illustrates an idealized easy magnetization axis hysteresis characteristic of a magnetic element having uniaxial anisotropy.
Figure 2:
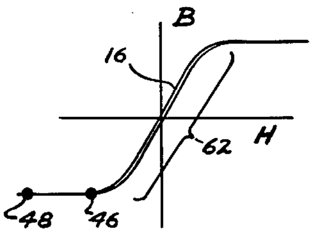
FIG. 2 illustrates an idealized hard magnetization axis hysteresis characteristic of a magnetic element having uniaxial anisotropy.

With reference now to the accompanying drawing, like numbers designate like parts and circuit features in the various figures. This invention uses easily magnetically saturated ultra-thin ferromagnetic cores as logical switching elements. These cores are preferably formed by the method disclosed by Sidney Rubens in Patent No. 2,900,282, issued on August 13, 1959. Such cores exhibit magnetic uniaxial anisotropy. Each core has a preferred or easy axis of magnetization with a hysteresis characteristic 10 wherein the residual magnetization flux density as at 12 is a large proportion of the so-called saturation magnetization as at 14. A second magnetization axis exists in the plane of the thin film cores which is perpendicular to the so-called easy axis and is termed the transverse or hard axis of magnetization. The hard axis exhibits a hysteresis characteristic 16 as shown in FIG. 2 and acts as an efficient transformer core which is easily magnetically saturated.

Figure 3:
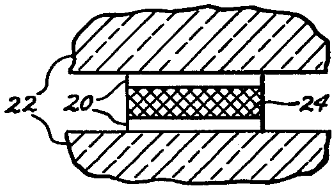
FIG. 3 is a diagrammatic showing of the preferred ferromagnetic element construction as used in the present invention.
Figures 6, 7:
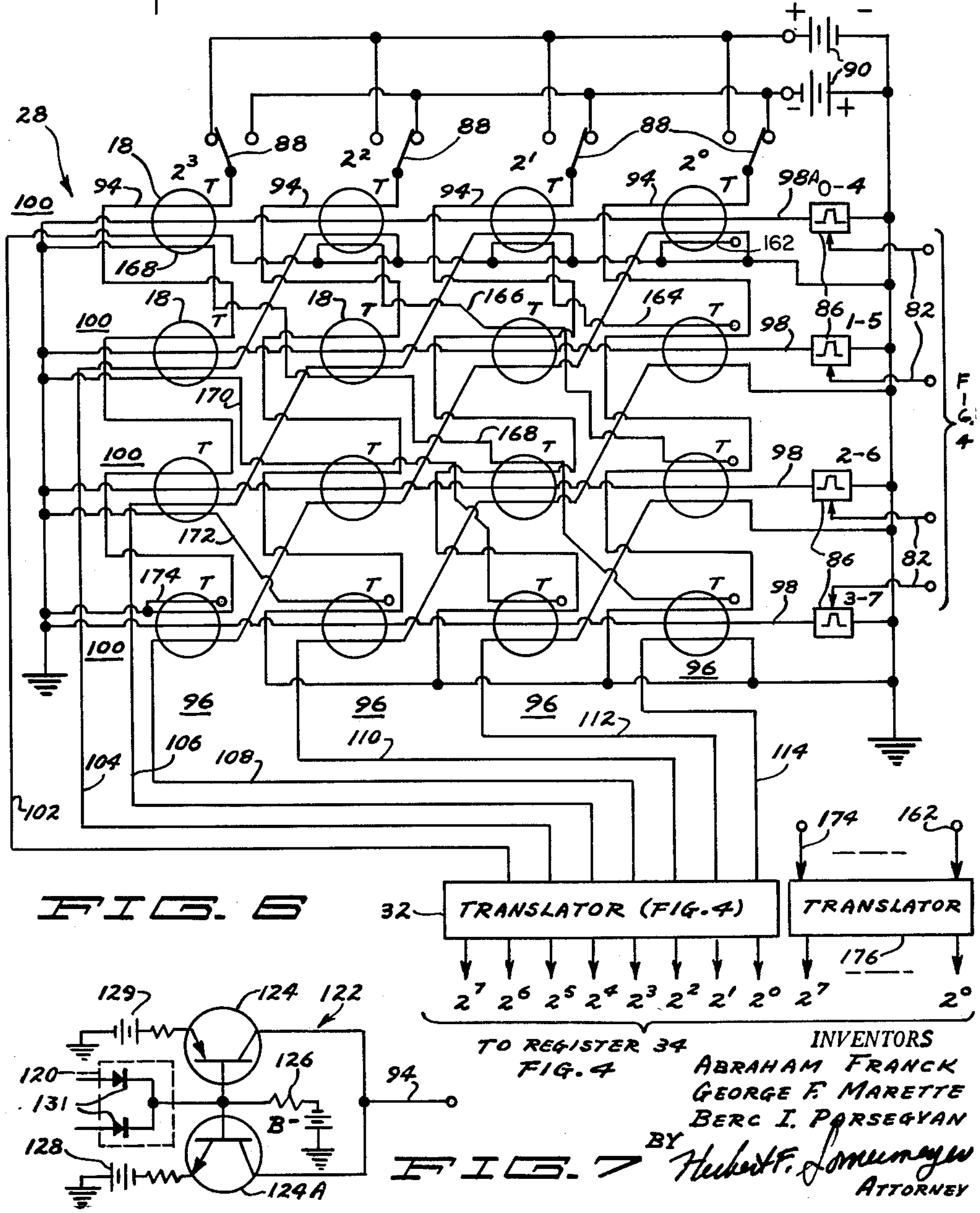
FIG. 6 is a somewhat simplified diagrammatic illustration of a shift matrix with necessary controls for use in the FIG. 4 embodiment.
FIG. 7 is a schematic diagram of a bidirectional current impulse source suitable for use with the present invention.

The cores are preferably disk shaped as indicated by the circles 18 in FIG. 6 and are used in pairs as viewed in FIG. 3. The thin-film disk-shaped cores 20 are deposited on the smooth glass substrates 22 with the insulated windings hereinafter described being disposed between the cores 20 in the cross-hatched area 24. All the circular symbols used in this application indicate the FIG. 3 construction using circular disk magnetic elements, no limitation to the specific construction being intended.

Figure 4:
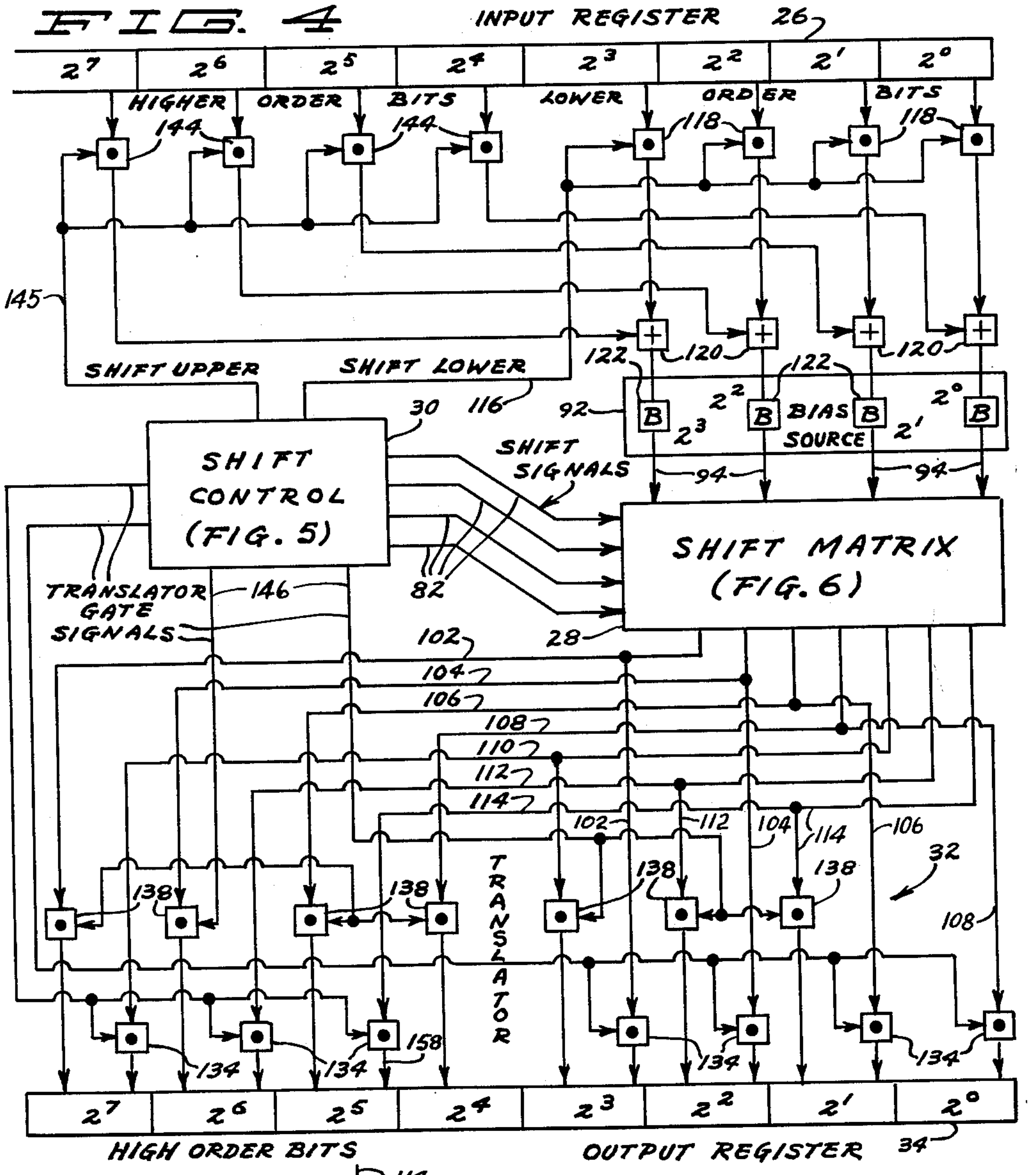
FIG. 4 is a block diagrammatic showing of an exemplary embodiment of the present invention for right-hand shifting.

With particular reference to FIG. 4 there is an input register 26 shown with eight binary stages, each consisting of a suitable bistable electrical element, such as a flip-flop. In the simplified illustration one "word" of binary encoded information consists of four binary digits (bits) being arbitrarily assigned the values $2^0$ through $2^3$. The register 26 is a "double-length" register in that two words may be stored therein as binary signals. The lower order stages $2^0$ through $2^3$ are termed the lower half while the higher order stages $2^4$ through $2^7$ are termed the upper half of the register.

It is desired that the information signals in the register 26 be shifted in position in the shift matrix 28 under the direction of shift control 30. The output signals from the matrix 28 are translated by the circuitry generally designated by the numeral 32 and thereafter inserted into the double-length output register 34. For a right shift of two stages or digit positions, the information initially contained in the $2^7$ stage of the register 26 will end up in the $2^5$ stage of the register 34 and so on for all the other stages. In what is termed an "end-around" or "circular" shift the contents of the $2^0$ and $2^1$ stages of the register 26 are respectively inserted into the two highest order stages of the register 34 namely stages $2^6$ and $2^7$.

Figure 5:
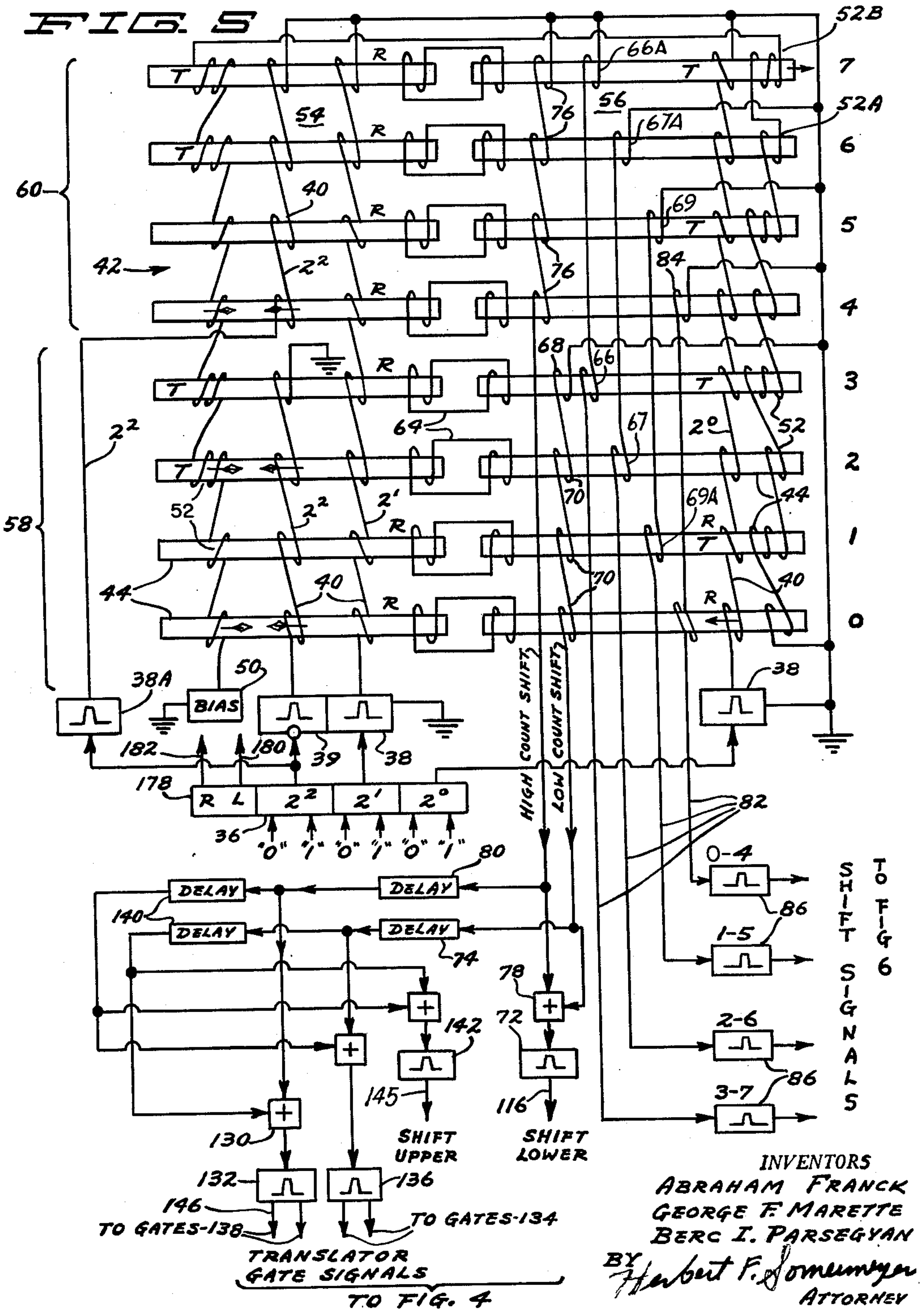
FIG. 5 is a combined block and schematic illustration of a shift control for use in the FIG. 4 embodiment.

The sequencing of signal transfers to effectuate the shifting of the double-length word through the single-word handling shift matrix 28 is best understood with reference to FIG. 5. The number of places that it is desired to shift the contents of the input register is inserted into a shift-count register 36 having a modulus one less than the number of stages of the input register. In the illustration a three binary stage shift-count register is necessary to control the complete shifting of the input register 26 containing eight binary signals.

For a two digit position shift, signals indicating a binary 010 are inserted into the shift count register 36. The register 36 output signals are applied to the bias current generators 38, 38A and 39, each of which provides a predetermined current magnitude through the respective bias windings 40. In FIG. 5 only, the magnetic cores used as saturable transformers, are shown schematically as the bars 44 with the respective axes of hard magnetization lying along the direction of the bar lengths. It should be understood that each bar 44 represents the physical construction shown in FIG. 3.

Each element 44 in the shift count matrix indicated generally by numeral 42 is biased to one of two magnetic saturation states as represented by the points 46 or 48 on the hysteresis characteristic 16 of FIG. 2 by the direct current bias source 50. The series connected windings 52 preferably have either one turn as the windings 52A or two turns as the windings 52B or at least the ratio of the windings linking predetermined cores is 2:1. The current from the bias source 50 magnetically drives the respective cores with the one turn winding to point 46 while the two turn winding cores are at point 48.

When the respective bias generators 38 are receiving a one signal and the generators 38A and 39 are receiving a zero signal, predetermined current magnitudes are provided in the respective windings 40. The resultant mmf.'s either aid or oppose the bias mmf.'s as indicated in the following table wherein "X" indicates bias opposing and "—" indicates bias aiding mmf.'s.

TABLE 1

*Drive Winding Arrangement of Shift Count Matrix*

| Row Number | Core Column Number | | | | | | |
|---|---|---|---|---|---|---|---|
| | 54 | | | | 56 | | |
| | Bias, mmf. | Windings | | | Bias, mmf. | Windings | |
| | | $\overline{2}^2$ | $2^2$ | $2^1$ | | loop | $2^0$ |
| 7 | 2 | | X | X | 2 | X | X |
| 6 | 2 | | X | X | 1 | X | — |
| 5 | 1 | | X | — | 2 | X | X |
| 4 | 1 | | X | — | 1 | X | — |
| 3 | 2 | X | | X | 2 | X | X |
| 2 | 2 | X | | X | 1 | X | — |
| 1 | 1 | X | | — | 2 | X | X |
| 0 | 1 | X | | — | 1 | X | — |

In the above table the bias mmf. number indicates the bias turns and the $\overline{2}^2$ indicates that a current is provided whenever a zero signal is in the $2^2$ digit position of the register 36.

The $2^2$ stage of register 36 controls the bias drivers 38A and 39 such that these drivers are respectively actuated for a one and a zero in the $2^2$ stage to provide a current impulse respectively to the higher order four core rows 60 and the lower order rows 58. The zero pulse to the rows 58 is transferred through two of the column 54 cores 44 as determined by the signal in the $2^1$ stage. If a one is present the current in the $2^1$ winding 40 opposes the bias mmf. in rows 2 and 3 to move the magnetizations to the point 46 permitting the generator 39 current pulse to force the magnetization into the high permeability region 62 (FIG. 2) for inducing a signal in winding loop 64. An impulse is transferred through the two loop windings 64 pulsing the column 56 row 2 and 3 cores in opposition to their respective bias mmf.'s. When the $2^0$ stage has a one signal the row 3 core is biased to point 46 while the row 2 core is biased to the point 48. Accordingly a voltage is induced only in the windings 66 and 68. By inspecting the Table 1 the complete binary to octal signal translation can be made apparent to one skilled in the art, further explanation herein being felt to be repetitious. It should be noted that the cores with a double winding 52 require two coincident opposing signals to force the magnetization into the high permeability region 62; one opposing signal forces the magnetization to point 46 with the second forcing it into region 62.

The winding 68 is series connected with the three windings 70 respectively on the column 56 rows 0, 1 and 2 cores to transfer part of the generator 39 signal to the current pulse source 72 and part to the delay line 74. This signal indicates the shift is less than 4, i.e., the number of digital signals in a single length word. Similarly for a shift count between 4 and 7 inclusive, the four windings 76 transfer a portion of the generator 38A signal to the current pulse source 72 through the logical OR circuit 78 and to the delay line 80. Only one of these two signals appear during any one shifting operation to control the translator gates as later described to effect the double-length word shift. Remember insertion of the shift signals into the register 36 initiated the shift operation.

The actual shift signals on the lines 82 are respectively provided by the series connected sense winding 66, 66A, 67, 67A, 69 and 69A pairs on the cores 44 respectively on the row pairs 1–5, 2–6, 3–7, and the single sense winding 84 on the row 4 core. A signal is provided over only one of the lines 82 for a shift greater than zero to actuate only one of the shift signal current generators 86 providing a one step shift of a single-length word as now described with reference to FIGS. 4 and 6.

In FIG. 6 the SPDT switches 88 and the two battery sources 90 correspond to the FIG. 4 bias source 92. By moving the switches 88 to either the left or right hand position, as seen in FIG. 6, opposing bias currents flow through the signal windings 94 to respectively magnetically bias all core elements 18 in the columns 96 to one of two magnetic saturation directions along the respective hard axes. As shown, the information represented by the switch 88 positions from left to right as 0111 or decimal 7.

Each of the current pulse sources or shift interrogating drivers 86 is connected to a single winding 98 linked to the hard axis of every core 18 in the respective rows 100. The rows in which the respective cores through which the shift signals are transferred are indicated adjacent the drivers 86. Accordingly for a shift of 0 or 4 places or positions the upper drive line 98A is pulsed. The resultant mmf.'s developed by current flowing through the line 98A aid the zero indicating bias signals so as to magnetically drive the binary one biased cores into their high permeability regions to induce voltages in the three sense windings 104, 106, and 108. The remaining sense windings 102, 110, 112 and 114 have no voltages induced therein.

One sense line or winding is provided on each diagonal from upper right to lower left on the matrix. By inspection it is seen that for a different winding 98 carrying a current impulse, different sense lines will carry the resultant signals to the translator 32 wherein the shift is completed.

In the table below the correspondence between the input windings 94 and the output line numbers for each driver 86 is shown.

TABLE 2

*Shift Matrix Operation*

| | Input Lines | | | |
|---|---|---|---|---|
| Shift Higher order | ${}^{7}2$ | ${}^{6}2$ | ${}^{5}2$ | ${}^{4}2$ |
| Driver Lower order | ${}^{3}2$ | ${}^{2}2$ | ${}^{1}2$ | ${}^{0}2$ |
| 3–7 | 108 | 110 | 112 | 114 |
| 2–6 | 106 | 108 | 110 | 112 |
| 1–5 | 104 | 106 | 108 | 110 |
| 0–4 | 102 | 104 | 106 | 108 |

The control and sequencing of digital signals to be shifted will now be described. The operation of the just described shift matrix with the shift sequences will become apparent from the next few paragraphs.

The shift sequencing signals are derived from the windings 70 and 76 of FIG. 5. Both signals are applied to the current pulse source 72, which emits a digital current pulse over the line 116 to momentarily open the lower order AND circuits 118 (FIG. 4) to pass the digital information signals from register 26 respectively through the diode OR circuits 120 to the bias source 92. The source 92 biases the ferromagnetic elements in the shift matrix as heretofore described.

The source 92 consist of four bi-polar current sources 122. FIG. 7 shows one type of bi-polar current source consisting of complementary transistors 124 and 124A each having their collectors joined and connected to a line 94. The base electrodes are also joined and connected to a negative reference voltage B— through the large resistance 126. The emitters are respectively connected to opposite polarity battery sources 128 and 129 for respectively providing oppositely flowing current in the line 94 as will be described.

The OR circuit 120 includes the diodes 131 connected in the conventional manner to provide this logical function. Without a positive voltage applied to OR circuit 120 the B— source causes both base electrodes to be negative with respect to ground causing current to flow through the transistor 124A while the other transistor is non-conductive. This is a "zero" signal. A positive voltage applied to either one of the diodes 131 makes the base electrodes positive with respect to ground causing the transistor 124A to be non-conductive and the other transistor conductive to provide on oppositely flowing current in the line 94 to provide the aforedescribed "one" bias currents. Concurrently with the described bias currents the shift signal is provided from one of the current pulse sources 86 to be selectively transferred to the translator 32 as aforedescribed.

As shown in FIG. 5 the same signal from the windings 76 is delayed through the delay 80 and applied through the OR circuit 130 to the unidirectional voltage pulse source 132, which may be a conventional digital pulse amplifier, to open the AND gates 138 (FIG. 4) for gating the shift matrix 28 output signals to the output register as will be described. Similarly the lower order windings 68 and 70 (FIG. 5) provide a pulse when generator 39 is actuated by the register 36. The delay 74 passes low count signal to the voltage pulse source 136 to open the electronic AND gates 134 (FIG. 4) to connect the shift matrix 28 output signals to the output register.

Each set of translator 32 gates 134 and 138 connect the respective matrix output lines 102 through 114 to the digit positions of the output register 34 as indicated in the table below. The numbers 0–7 are exponents of the output register digit positions indicated in the drawing.

TABLE 3

*Translator Connections*

| Matrix Output Line No. | Output Register Digit Positions (Exponent Value) | |
|---|---|---|
| | Gates 134 | Gates 138 |
| 102 | 3 | 7 |
| 104 | 2 | 6 |
| 106 | 1 | 5 |
| 108 | 0 | 4 |
| 110 | 7 | 3 |
| 112 | 6 | 2 |
| 114 | 5 | 1 |

From inspection of the above Tables 2 and 3 it is seen that the gates 134 are for transferring the lower order input word signals in shifts of 0, 1, 2, 3 (a shift count less than the number of signals in a single length word) and the higher order input word signals in shifts of 4, 5, 6, 7 (a shift count greater than the number of signals in a single length word minus one). The gates 138 transfer the lower order signals in shifts of 4 through 7 and the higher order signals in shifts 0 through 3. Specific examples follow.

Assume a double-length word 01111000 is to be right circularly shifted one digit position to yield 00111100. Since the shift is less than the number of signals in one single length word, the gates 134 are opened first for transferring the lower order signals (gates 118 are opened by the shift lower signal on line 116 to first transfer the lower order digits to matrix 28) and the gates 138 are then subsequently opened to transfer the higher order signals (the higher order signals are transferred through gates 144 to matrix 28 after the lower order digits have been processed). In both the higher and lower order halves, the matrix output signals appear on lines 104, 106, 108 and 110 (Table 2) and as can be seen by inspecting FIG. 6 for a shift of 1 by the 1–5 pulser.

From Table 3 it is then seen the lower order signals go to the next right digit position except the line 110 signal goes to the seventh digit position ($2^7$). Further the higher order signals go to their respective next right digit position to yield the desired shifted result.

The signal transfers from input register 26 to output register 34 are now traced. First a signal on the line 116 enables or opens the coincidence gates 118 for transferring the signal pattern in positions $2^0$, $2^1$, $2^2$ and $2^3$ from register 26 via the diode OR circuits 120 to the bias source 92 such that the bias current drivers 122 provide a current pattern through the respective lines 94 representing the register 26 pattern into the matrix 28. Assuming a signal pattern 1000, as aforeassumed, the generators 122 (see FIG. 7) provide a "minus" (0) magnetization drive on the $2^0$, $2^1$ and $2^2$ lines 94 while the $2^3$ line 94 current provides a "positive" (1) magnetization drive for forcing all cores 18 in the respective columns, $2^3$, $2^2$, $2^1$ and $2^0$ to the 1, 0, 0 and 0 states respectively. While such currents are so forcing the matrix 28 cores magnetization the control 30 emits a single shift pulse on one of the lines 82, for example on the shift 1–5 line 82 as best shown in FIG. 6. This pulse activates only the 1–5 pulser 86 for providing a current over its associated line 98 for driving the magnetization of the cores in the 1–5 row to minus (0) magnetization direction or state. Note only the cores in row 1–5 are affected. Since the cores in columns $2^2$, $2^1$ and $2^0$ are already in the minus (0) state, an insubstantial change occurs respectively inducing no or an insignificant voltage in sense lines 106, 108 and 110, respectively. Since the $2^3$ column row 1–5 core 18 was in the positive (1) state, the 1–5 pulser 86 current switches its magnetization inducing a substantial voltage in line 104. Therefore, by defining an induced voltage as a "1" and no induced voltage as a "0" the register 26 signals 1000 are reproduced on lines 104, 106, 108 and 110 in the same signal pattern.

Since the other sense lines 102, 112 and 114 are not coupled to row 1–5 cores, they can be ignored for the moment. However, please note that the various sense lines of matrix 28 to become involved in a signal shift must be coupled to, cores in a matrix row activated by its associated pulser.

All sense lines are input connected to translator 32 as best seen in FIG. 4. It will be remembered the lower order digits $2^3$, $2^2$, $2^1$ and $2^0$ of register 26 are being transferred. Accordingly, a signal from control 30 (pulser 136 as activated by a control signal through delay 74 as seen in FIG. 5) is applied to the gates 134 for opening all of such gates. These gates are connected to the respective digit positions of the register 34. Since the sense lines 102, 112 and 114 are not coupled to the row 1–5 cores, the signal pattern in register 34 is 0XXXX100 where "X" indicates no inputs, i.e., the digit positions wherein the high order bits will be subsequently inserted. Note the low order bits have been effectively circularly right-shifted one place or digit position.

Next the high order digit signals $2^7$, $2^6$, $2^5$ and $2^4$ of register 26 will be shifted. Referring first to FIG. 5, the control signal from the delay 74 in addition to activating pulse source 136 is delayed through the delay line 140 for effectuating transfer of the high order bits to register 34. First the line 140 signal is applied to pulse source 142 for opening the gates 144 via shift upper control line 145. These gates 144 transfer the signals from the high order register 26 positions to bias source 92 via OR gates 120. The cores in matrix 28 are biased as aforedescribed but to represent the signal pattern of $2^7$, $2^6$, $2^5$ and $2^4$, for example 0.111, as aforeassumed.

The same line 140 (FIG. 5) delayed signal is also applied through OR gate 130 to pulse source 132 for opening gates 138.

Substantially simultaneously therewith the 1–5 pulser 86 emits a second pulse reinterrogating the cores in row 1–5 over the line 98. The pulsers 86 are of the type providing two output pulses in a time spaced relationship for each received single input pulse. Such an arrangement is shown in detail in the copending patent application of Cray et al., Serial No. 585,312, filed May 16, 1956, for Digital Incremental Computer, in FIG. 3, and assigned to the assignee of this application. That pulser provides four output pulses for a single input pulse while pulsers 86 use only two of the four output pulses. The timing of the pulsers 86 between successive outputs is adjusted to be equal to the delays 140 such that the second output pulse of pulsers 86 is coincident with the output from the pulsers 132 or 136.

Since the gates 138 are now open, the outputs from the matrix 28 on the four lines 104, 106, 108 and 110 are respectively gated to the output register 34 digit position $2^6$, $2^5$, $2^4$ and $2^3$ providing a signal pattern in the register 34 of 00111100 which is the original pattern right-shifted one digit position.

As aforestated the double length right shift is performed in two steps. Referring again to FIG. 5, two delay lines 140 respectively delay the high (4–7) and low (0–3) count signals to provide same to the respective pulse sources 136 and 132 at a later time. Concurrently therewith, the line 140 delayed signal is applied to voltage pulse source 142 to open the upper input gates 144 (FIG. 4) passing the upper half on higher order signals from register 26 double-length word to the bias source 92.

It should be noted the AND circuits 118 decouple the lower order bit positions of the register 26 before the gates 144 effectively couple the higher order digit positions to the bias source. Accordingly, the current pulse sources 86 provide a pulse having a duration extending the time for transferring the signals from the input to the output register. The gated information signals from the input register digit positions provide the signals transferred through the shift matrix 28 by providing the necessary flux change in the magnetic elements as previously described.

It should be noted that the lower order input digit positions are always shifted first. Referring to FIG. 5 it is seen that for a shift count less than four, the initiating signal from one of the windings 68–70 actuates the voltage pulse source 136 first. At a later time the source 132 is actuated. The effect is to provide a right handed end around shift. That is, the low order bits are shifted toward the higher order output register 34 digit positions while the higher order input signals are at least partially shifted into the lower order portion of the register 34.

For shift counts greater than three the sources 132 and 136 are actuated in a reverse order the effect of which has been described with reference to the Tables 2 and 3. Referring to the previous example, it should be noted that when the gates 138 are opened first the lower order pattern 1000 is inserted respectively in register 34 digit positions $2^6$, $2^5$, $2^4$, and $2^3$ making a pattern X1000XXX wherein the X's denote unfilled digit positions in the output register. This is a right shift of five places. During the second phase of the shift operation, the gates 134 are opened for placing the higher order pattern 0111 respectively into the digit positions $2^2$, $2^1$, $2^0$ and $2^7$, making a completed pattern of 11000011, which is original pattern of 01111000 circularly right-shifted five places. In a similar manner the shifts of 4, 6, and 7 are accomplished.

Figure 8:
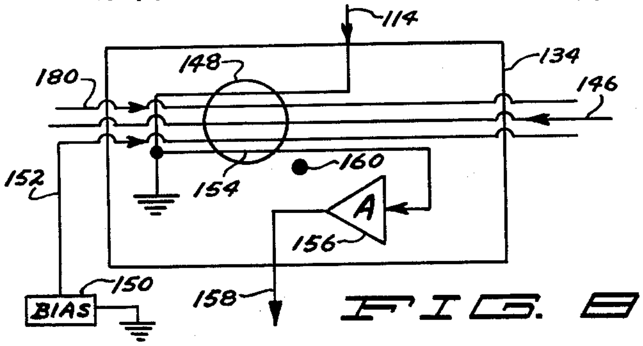
FIG. 8 is a schematic diagram of a logical AND circuit used in the FIG. 4 embodiment.

The gates 134 and 138 and the AND circuits 118 and 144 may be constructed as schematically shown in FIG. 8. For descriptive purposes it is described as a gate 138 receiving an information signal from the shift matrix output line 114 and having a drive line 146 from the FIG. 5 shift control voltage source 132. Each gate has a ferromagnetic element 148 with all the windings linked to its hard axis and preferably having all the residual magnetization aligned with its easy axis. A bias source 150 is connected to a winding line 152 which is magnetically linked to all elements 148 in each AND circuit or gate. The current flowing therethrough magnetically biases each element 148 to magnetic saturation state 48 shown in FIG. 2. A signal on the line 114 moves the element magnetic state to point 46. A concurrently applied current pulse on the line 146 magnetically shifts the element state into the high permeability region 62 for inducing a voltage in the sensing winding 154. Either one of the signals on the lines 114 and 146 are alone insufficient to provide an output signal in the winding 154. The induced voltage is amplified by a pulse amplifier 156 and transferred over an output line 158 to the output register 34. The dot 160 is intended to indicate the logical AND function just described.

It is to be understood that each of the single length word portions are propagated through the shifting circuit in an extremely short period of time, two of these time periods being required to sequence a complete shift.

The just described embodiment may be easily adapted for left end around shifts in the following described manner. First sense windings 162 through 174 are added to the FIG. 6 shift matrix, each of which corresponds to one of the lines 102 through 114 but which are disposed on the opposing diagonals as indicated for the windings 162, 164, 166, 168, 170, 172 and 174 in FIG. 6.

An additional translator 176, as shown in FIG. 6, is connected to the sense lines 162 through 174. Two sets of gates, such as gates 134 and 138, constitute the translator 176 with the connections being made in the manner indicated in the following table.

TABLE 4

*Left Shift Translator Connections*

| Shift Matrix Output Line | Output Register Gates 134 | Connections Gates 138 |
|---|---|---|
| 162 | 4 | 0 |
| 164 | 5 | 1 |
| 166 | 6 | 2 |
| 168 | 7 | 3 |
| 170 | 0 | 4 |
| 172 | 1 | 5 |
| 174 | 2 | 6 |

In the above table the numbers zero through seven indicate the exponent of the register 34 digit position to which the gates are connected.

One addition is necessary in the FIG. 5 shift count register 36. One additional digit position 178 is added to indicate shift direction. When in a first binary indicating state, a current is provided over a line 180 which acts as an additional bias winding to the gates 134 and 138 of FIG. 4. As seen in FIG. 8, the line 180 current is flowing parallel to the bias line 152 current. Accordingly the element 148 is magnetically biased further toward saturation such to prevent both the line 114 and 146 signals from inducing a voltage in the sense winding 154. In this manner the gates 134 and 138 are closed, i.e., biased to point 48 or further into saturation such that the translator gate signals on line 146 are ineffective to move the magnetization into region 62. The translator 176 then translates the shift matrix 28 output signals for a left shift.

Placing the bistable circuit 178 in the other binary state provides a current on the line 180 thereby closing all of the translator 176 gates in a like manner while the lack of a current on line 180 permits the translator 32 gates to be opened.

The shift operation is automatically started by insertion of information signals into the register 36 (FIG. 5) to induce a signal in two of the matrix 42 core windings as hereinbefore described.

It is understood that suitable modifications may be made in the structure as disclosed, provided such modifications come within the spirit and scope of the appended claims, having now therefore fully illustrated and described our invention, what we claim to be new and desire to protect by Letters Patent is:

1. A digital signal shift circuit comprising two single-length digital-word input means, each means carrying a predetermined number of electrical bivalued signals, single-length digital-word parallel signal shifting means connected to the input means and having a double-length digital-word set of output lines whereby a single length word from the input means is transferred to predetermined ones of the lines for a predetermined signal shift irrespective of any arbitrarily assigned numeric values in the words, two output gating means with each means being connected to every output line, output signal utilization means connected to the output gating means such that one output gating means effectively connects each output line to the utilization means displaced one single-length-digital-word from the other output gating means effective connection, and control means in the shift circuit for sequencing the operation of same and including shift count means connected to the output gating means for sequentially momentarily opening the output gate means in a predetermined sequence related to shift count magnitude whereby the signals from the input means are shifted relative to their respective locations in the input means.

2. A double length shift circuit comprising two single length digital signal input means each of which have a predetermined number of digital positions, each means carrying a predetermined number of electrical bivalued signals, a set of input gates respectively connected to each input means digit positions, single digital word length shifting means connected to both sets of input gates and having more than said predetermined number of output lines, two sets of output gates each having a gate connected to each output line, double word length digital signal output means having twice the predetermined number of digit positions, the output gates being respectively connected to the output means digit positions such that the gates connected to the same output line are respectively connected to output digit positions displaced apart in the output means by the predetermined number of digit positions, control means electrically connected to all of the gates and shift means whereby a first and then a second digital signal word is transferred from the respective input means to the output means, and the control means having shift count means connected to the output gates whereby one output set is first momentarily opened before the other when the shift count is greater than the predetermined number minus one and the reverse when the shift count is less than the predetermined number.

3. A digital signal shift register comprising double-word length digital signal input means, shift control means including a shift count register and a ferromagnetic core matrix, a single word length ferromagnetic core matrix consisting of a rectangular array of uniaxially anisotropic magnetic cores in rows and columns with all cores along each diagonal parallel to one of the major diagonals being magnetically linked by a sense line, bias winding means connected magnetically to every core in the respective columns for biasing said column cores to one of two magnetic saturation states in one direction, the control means being electrically connected to the input means to transfer first a one single word length set of digital signals and then a second single word length set of digital signals to the bias means, the control means including separate winding means magnetically connected to all cores in each row of cores for driving the core magnetization into a high permeability region only when the cores are in one of said saturation states, gating means connected to the sense lines for receiving signals therefrom and responsively connected to the control means for opening and closing whereby the sense line signals are passed in a manner to provide an effective shift of the sense line signals with respect to the input signals.

4. A double-length shift circuit comprising digital signal input means having two single word length portions each of which with a predetermined number of digit positions, a single word length magnetic core matrix shift means for simultaneously shifting all signals of one single length word up to a number of digit positions equal to said predetermined number, control means including shift count means and being connected to the input means and the matrix means for effectively connecting a first and then the other input portions to the matrix means a plurality of output lines in the matrix means, the matrix means being responsive to the control means for effectively connecting the first and other input portions to like output lines whereby signals in each portion are shifted in sequence a like second predetermined number of digit positions, two sets of gates each set having one gate connected to each respective output line, a double length word digital output register having the same number of digit positions as the input means, the gates in the respective sets connected to the same output line being respectively connected to digit positions in the output register spaced apart therein the numbers of signals in a single length word, and the control means being connected to the gate sets for sequentially opening first one and then the other set whereby the output line shifted signals are inserted into the output register in a predetermined shifted relation to the input signals.

5. A digital signal shifter for shifting a double-length word through a single length shift matrix comprising double-length digital signal word input means, a single length word matrix consisting of rows and columns of saturable transformer elements each having a magnetic core exhibiting uniaxial anisotropy with all windings associated therewith magnetically linking the hard axis, control means including shift count means and for sequencing the shifting, two single word length input gating means respectively connected to different single length portions of the input means and to the control means for being sequentially momentarily opened for transferring input digital signals therethrough, bias means connected to both input gate sets and having separate windings respectively magnetically linking all cores in each column with one winding for each digital signal in a single length word, an electrical current source associated with each matrix row and having a winding magnetically linking every core in the respective rows, a plurality of output lines respectively magnetically linking all cores in each diagonal of the matrix lying in one direction, the current sources being controllingly connected to the shift count means whereby one source provides a current indicative of a first shift count portion, digital signal translating means connected to the output lines and to the shift count means for receiving a second shift count portion, utilization means connected to the translating means, and the translating means being responsive to the shift count means for transferring the output line signals from one and the other input means portions respectively in a non-shifted and a single word length shifted manner for a first set of signals in the second shift count portion and the reverse for a second set of shift count second portion signals.

6. Apparatus as in the claim 5 wherein the gates include a saturable magnetic core having uniaxial anisotropy in its logical decision element.

7. A double length shift circuit comprising input means having two digital signal word portions each of which has a predetermined number of digit positions, two sets of magnetic core input gates respectively electrically associated with the input portions; single length digital shifting means including a magnetic core matrix, bias means magnetically associated with the cores in each respective column and connected to both sets of input gates, a plurality of output lines respectively magnetically associated with all cores aligned with matrix diagonals in one direction, and current pulse means magnetically associated with all cores along each matrix row; two sets of output gates each having a magnetic core as a logical decision element and the gates in each set being respectively connected to the output lines, double length output means having twice the predetermined number of digit positions, the gates in each output set which are connected to the same output line being respectively connected to output means digit positions which are separated the predetermined number of digit positions; control means for sequencing shift operations and including shift count register means, translating means including a saturable magnetic core matrix having windings connected to the register means whereby all cores in only one row have their respective magnetizations modified in a like predetermined manner which is different than at least one core magnetization modification in every other row, a plurality of first shift winding means respectively magnetically associated with the saturable cores in the shift count matrix rows for detecting the predetermined magnetization modifications, second shift count winding means each respectively magnetically associated with cores in the predetermined number of shift count matrix rows, the latter windings being connected to the control means and the control means being connected to the output gates and being responsive to digital signals from a first one of said latter windings for momentarily opening a first and then the other output gates and the reverse sequence when a digital signal is received from the other said latter winding.

8. A double-length shift circuit comprising digital signal input means having two single word length portions each with a predetermined number of digit positions, two sets of input gates respectively connected to the input portions and each having the predetermined number of magnetic core gating circuits, single word length digital shifting means consisting of magnetic core matrix gating portions with a plurality of output lines each magnetically associated with predetermined ones of the gating portions for effectuating a signal position shift, two sets of output magnetic core gates with each set having one gate connected to each of the output lines, a double-length digital word output register having digit positions respectively connected to the output gates such that any two gates connected to the same output line are respectively connected to digit positions separated by the predetermined number of positions, shift control means having a split shift count means wherein the binary significance of the most significant digital shift count position is indicative of one of two output shift sequences, the control means being connected to all gates for sequentially momentarily opening one input gate set and then the other and substantially simultaneously for a first binary significance causing a first and then the other output gate set to momentarily open and the revserse sequence for a second binary shift count significance, the control means being connected to the shift means for effectuating a predetermined signal position shift therethrough simultaneous to said gate openings, and all of the cores consisting of saturable magnetic material with magnetic uniaxial anisotropy.

9. Apparatus as in the claim 8 wherein the cores in the input and output gates have all the respective connections magnetically associated with its hard magnetization axis, steady bias means connected to each gate for biasing its magnetic core to a first magnetic saturation state, and the other connections being such as to oppose the bias whereby a predetermined signal from each of two connections are required to urge the core magnetization into a high permeability region of its hysteresis characteristic for providing an output signal.

10. Apparatus as in the claim 9 wherein the shift count means comprises a shift count digital register having a modulus one less than twice the predetermined number, a shift count matrix of saturable magnetic cores with uniaxial anisotropy arranged in twice the predetermined number of rows, winding means connected to respective digit positions of the shift count register except one, the one digit position having two binary outputs, two binary windings respectively connected to the binary outputs and magnetically associated with a different predetermined number of shift count matrix rows, a plurality of shift count output line means respectively magnetically linked to two shift count core rows which are spaced apart by the predetermined number of such rows and connected to second predetermined ones of the shifting means gating portions for causing said signal position shift, and two winding means respectively magnetically associated with the two binary windings and with the control means for transferring the binary signals thereto.

11. Apparatus as in the claim 10 wherein the steady bias means is magnetically associated with all the shift count matrix cores such that the cores associated with the shift count register connected winding means with each digit position are magnetically biased respectively to first and second magnetic saturation states in the same relative directions in alternating groups having a number of cores equal to the binary exponent arbitrarily assigned to the respective digit positions, and a plurality of separate winding means interconnecting all cores in each shift count matrix row.

12. For sequentially connecting single word length digital shifting means double-length set of output lines to a double-length digital register for completing a digital signal shift, two double length sets of gates each having one gate connected to each of the output lines, the gates in one set being connected to the digital register such that numerically adjacent output lines are connected to adjacent positions in the digital register, the gates in the other set being connected to the output register such that the gates in the respective sets which are connected to the same output line have their respective digital register connections separated by one word length, and control means connected to all gates for sequentially momentarily opening all the gates in each set.

13. Apparatus as in the claim 12 wherein the gates consist of a magnetic core matrix of two rows of cores, each row corresponding to the respective set of gates, each core consisting of saturable ferromagnetic material exhibiting magnetic uniaxial anisotropy with a hard magnetization axis bias means magnetically associated with the cores along their respective hard axes for magnetically biasing some to a first saturation state in a first magnetic direction, the output lines and the control means being magnetically associated with the hard axis of each respective core whereby simultaneous digital signals from both the respective line and control means connection causes the magnetization of that core into a high permeability region to provide a signal to the digital register.

14. A double-length bi-directional shift circuit comprising two single-length digital-word input means, single-length digital-word parallel signal shifting means connected to the input means and having two double-length sets of output lines arranged such that adjacent lines are for carrying digital signals respectively indicative of exponentially sequential numerical values, one set being for left-shifted words, two output gating means connected to each set of output lines and each having one gate connected to one line in the respective output line sets, shifted signal utilization means connected to all the gating means such that the respective gates connected to the same output line are connected to the utilization means one single digital word length apart, each of the gating means including a magnetic core having uniaxial anisotropy used as a logical AND component, control means having shift direction control means and shift magnitude control means each connected to all of the output gates whereby signals on only one set of output lines are transferred to the utilization means through gates opened by the shift magnitude control means in sequence as indicated by the shift magnitude control means.

15. For shifting a double-length digital signal word, two single length digital signal input means, single word length shifting means electrically connected to both input means and having a double-length set of output lines whereon a partially shifted set of single word length digital signals are transferred irrespective of numeric significance, control means electrically connected to the input means for causing sequentially transfer single length words of digital signals to the shifting means and having shift count means connected to the shifting means for causing the partial shift, and signal transposing gating means connected to the output lines and to the shift count means whereby the output line signals are effectively transposed one word length for a first range of shift counts and are not transposed for a second range of shift counts.

References Cited in the file of this patent

UNITED STATES PATENTS

| | | |
|---|---|---|
| 2,734,182 | Rajchman | Feb. 7, 1956 |
| 2,776,419 | Rajchman | Jan. 1, 1957 |